US009304448B2

(12) United States Patent
Wu et al.

(10) Patent No.: US 9,304,448 B2
(45) Date of Patent: Apr. 5, 2016

(54) INTERMEDIATE TRANSFER MEMBERS

(71) Applicant: Xerox Corporation, Norwalk, CT (US)

(72) Inventors: Jin Wu, Pittsford, NY (US); Kyle B. Tallman, Perry, NY (US); Qi Ying Li, Ontario (CA); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 297 days.

(21) Appl. No.: 14/027,212

(22) Filed: Sep. 15, 2013

(65) Prior Publication Data

US 2015/0076413 A1 Mar. 19, 2015

(51) Int. Cl.

*H01B 1/12* (2006.01)
*C08K 5/52* (2006.01)
*H01B 1/24* (2006.01)
*G03G 15/16* (2006.01)

(52) U.S. Cl.

CPC .................................... *G03G 15/162* (2013.01)

(58) Field of Classification Search

None

See application file for complete search history.

(56) References Cited

U.S. PATENT DOCUMENTS

| | | | | |
|---|---|---|---|---|
| 5,978,639 | A | 11/1999 | Masuda et al. | |
| 6,139,784 | A | 10/2000 | Oshima et al. | |
| 6,397,034 | B1 | 5/2002 | Tarnawskj et al. | |
| 6,699,485 | B1 * | 3/2004 | Pantini | A61K 8/86 424/401 |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 8,017,248 | B2 | 9/2011 | Qi et al. | |
| 2003/0119968 | A1 * | 6/2003 | Hara | G03G 15/162 524/495 |
| 2010/0247918 | A1 * | 9/2010 | Wu | C08G 65/007 428/411.1 |
| 2012/0052306 | A1 * | 3/2012 | Wu | C08L 79/08 428/421 |
| 2012/0243907 | A1 * | 9/2012 | Inagaki | G03G 15/162 399/121 |

OTHER PUBLICATIONS

Diaham et al., BPDA-PDA Polyimide: Synthesis, Characterizations, Aging and Semiconductor Device Passivation, University of Toulouse, 2012, Chapter 2, pp. 1-22.*

Solvay Solexis Polymers, Technical Data, Fomblin-HC-P2-1000, Jan. 27, 2012, pp. 1-3.*

* cited by examiner

*Primary Examiner* — Patrick English

(74) *Attorney, Agent, or Firm* — Eugene O. Palazzo

(57) ABSTRACT

An intermediate transfer member that contains a mixture of a polyimide, an optional conductive component, and a perfluoropolyether phosphate.

17 Claims, 1 Drawing Sheet

INTERMEDIATE TRANSFER MEMBERS

CROSS REFERENCE TO RELATED APPLICATION

Copending U.S. application Ser. No. 14/027,214, filed concurrently herewith, entitled MECHANICAL MIXING PROCESSES, the disclosure of which is totally incorporated herein by reference, illustrates a ball milling free and roll milling free process comprising the mechanical mixing of a mixture of ingredients comprising a polymer or a component that converts to a polymer, a perfluoropolyether phosphate, a conductive component, and a solvent.

This disclosure is generally directed to an intermediate transfer member comprised of a polyimide, optional conductive filler, and a perfluoropolyether phosphate.

BACKGROUND

Various intermediate transfer members, such as intermediate transfer belts selected for transferring a developed image in xerographic systems, are known. For example, there are known a number of intermediate transfer members that include materials of a low unacceptable modulus or break strength, poor release characteristics from metal substrates, and which members are costly to prepare primarily because of the cost or scarcity of raw materials and lengthy drying times. Also known are intermediate transfer members with characteristics that cause these members to become brittle resulting in inadequate acceptance of the developed image and subsequent partial transfer of developed xerographic images to a substrate like paper.

A disadvantage relating to the preparation of an intermediate transfer member is that there is usually deposited on a metal substrate a separate release layer, and thereafter, there is applied to the release layer the intermediate transfer member components, and where the release layer allows the resultant intermediate transfer member to be separated from the metal substrate by peeling or by the use of mechanical devices. Thereafter, the intermediate transfer member is in the form of a film, which can be selected for xerographic imaging systems, or the film can be deposited on a supporting substrate such as a polymer layer. The use of a release layer adds to the cost and time of preparation, and such a layer can modify a number of the intermediate transfer member characteristics.

For low end xerographic machines and printers that produce about 30 pages or less per minute, thermoplastic intermediate transfer members are usually used because of their low cost. However, the modulus values of thermoplastic materials, such as certain polycarbonates, polyesters, and polyamides, can be relatively low of, for example, from about 1,000 to 1,500 Mega Pascals (MPa).

Additionally, with a number of known intermediate transfer members there are usually required three separate components of a release additive, a leveling additive and a dispersing agent, which components can cause processes challenges and also add to the costs of the members.

There is a need for intermediate transfer members that substantially avoid or minimize the disadvantages of a number of known intermediate transfer members.

Further, there is a need for intermediate transfer members where a single component can function as a release additive, a leveling agent, and a dispersant.

Also, there is a need for intermediate transfer members with excellent break strengths as determined by their modulus measurements, which are readily releasable from substrates, and possess high glass transition temperatures, and improved stability with no or minimal degradation for extended time periods.

Moreover, there is a need for intermediate transfer member materials that possess rapid release characteristics from a number of substrates that are selected when such members are prepared.

Yet another need resides in providing intermediate transfer members that can be generated by flow coating processes, and that can be prepared by non-milling processes.

Another need relates to providing seamless intermediate transfer members that have excellent conductivity or resistivity, and that possess acceptable humidity insensitivity characteristics leading to developed images with minimal resolution issues.

Yet there is a need for intermediate transfer members where the functionalities of a release additive, leveling agent and dispersant, or dispersing agent are accomplished by one component.

Further, there is a need for seamless intermediate transfer members containing components that can be economically and efficiently manufactured, and where a single component can simultaneously function as a release additive, a leveling agent, and a dispersing agent.

These and other needs are achievable in embodiments with the intermediate transfer members and components thereof disclosed herein.

SUMMARY

Disclosed is an intermediate transfer member comprising a layer of a polyimide, a perfluoropolyether phosphate, and an optional conductive component.

Also disclosed is an intermediate transfer member comprising a single layer film of a polyimide, carbon black, and a perfluoropolyether phosphate as represented by the following formula/structure $$(HO)_2-\underset{\underset{O}{\|}}{P}-O(CH_2CH_2O)_s-CH_2CF_2O-(CF_2CF_2O)_p-(CF_2O)_q-CF_2CH_2-(OCH_2CH_2)_sO-\underset{\underset{O}{\|}}{P}-(OH)_2$$

where the ratio of p/q is from about 0.5 to about 3, and s is 1 or 2.

Further disclosed is an intermediate transfer member comprising in sequence a supporting substrate, a layer thereover comprised of a mixture of a polyimide, carbon black, and a perfluoropolyether phosphate as represented by the following formulas/structures $$(HO)_2OP—O—CH_2CH_2O—CH_2CF_2O—(CF_2CF_2O)_6—(CF_2O)_4—CF_2CH_2—OCH_2CH_2—O—PO(OH)_2;$$

$$(HO)_2OP—O—CH_2CH_2O—CH_2CF_2O—(CF_2CF_2O)_8—(CF_2O)_{10}—CF_2CH_2—OCH_2CH_2—O—PO(OH)_2;$$

$(HO)_2OP—O—(CH_2CH_2O)_2—CH_2CF_2O—(CF_2CF_2O)_{10}—(CF_2O)_8—CF_2CH_2—(OCH_2CH_2)_2—O—PO(OH)_2$;

or $(HO)_2OP—O—(CH_2CH_2O)_2—CH_2CF_2O—(CF_2CF_2O)_{12}—(CF_2O)_6—CF_2CH_2—(OCH_2CH_2)_2—O—PO(OH)_2$;

and wherein said perfluoropolyether phosphate functions as an internal release additive and a leveling agent for the polyimide, and as a dispersing agent for the carbon black, and wherein the member optionally possesses a Young's modulus of from about 7,500 to about 8,000 MPa.

FIGURES

The following Figures are provided to further illustrate the intermediate transfer members disclosed herein.

EMBODIMENTS

The terms "including", "includes", "having", "has", "with", or variants thereof are intended to be inclusive in a manner similar to the term "comprising". The term "at least one of" means, for example, that one or more of the listed items can be selected.

Any disclosed numerical value, however, inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges there between such as 2, 3, 4, 5, 6, 7, 8, 9, and 10, and about can include ranges below 1 and ranges above 10.

The disclosed intermediate transfer member can be comprised of a mixture of a polyimide and a perfluoropolyether phosphate, which composition self releases from a metal substrate, such as stainless steel, and where an external release layer on the metal substrate can be avoided. Thus, the disclosed coating mixture is cost effective since, for example, only one component is needed for the polyimide containing intermediate transfer member mixture.

Figure 1:
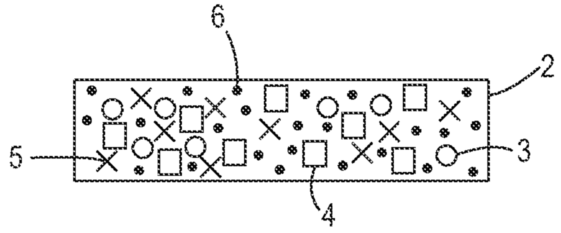
FIG. 1 illustrates an exemplary embodiment of a one-layer intermediate transfer member of the present disclosure.

In FIG. 1 there is illustrated an intermediate transfer member comprising a layer 2 comprised of a perfluoropolyether phosphate 3, a polyimide 4, an optional siloxane polymer 5, and an optional conductive component 6.

Figure 2:
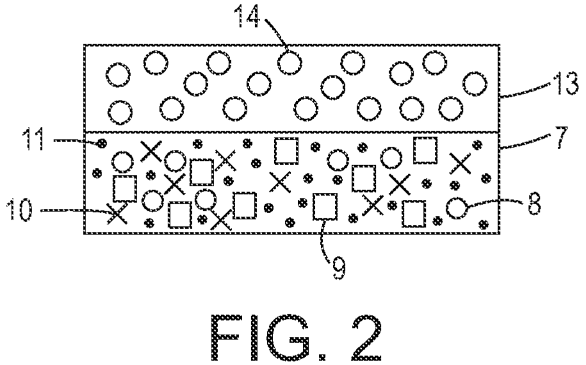
FIG. 2 illustrates an exemplary embodiment of a two-layer intermediate transfer member of the present disclosure.

In FIG. 2 there is illustrated a two-layer intermediate transfer member comprising a bottom layer 7 comprising a perfluoropolyether phosphate 8, a polyimide 9, an optional siloxane polymer 10, and an optional conductive component 11, and an optional top or outer toner release layer 13 comprising release components 14.

Figure 3:
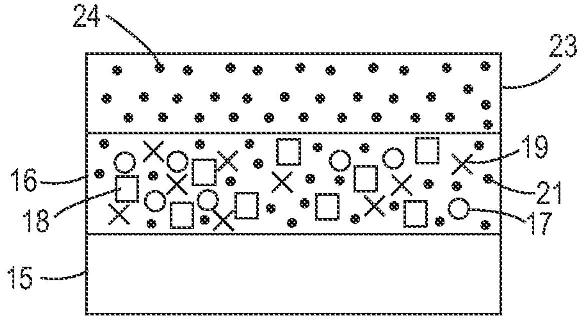
FIG. 3 illustrates an exemplary embodiment of a three-layer intermediate transfer member of the present disclosure.

In FIG. 3 there is illustrated a three-layer intermediate transfer member comprising a supporting substrate 15, a layer thereover 16 comprising perfluoropolyether phosphate 17, a polyimide 18, an optional siloxane polymer 19, and an optional conductive component 21, and an optional release layer 23, comprising release components 24.

Polyimides

Examples of polyimides selected for the intermediate transfer member mixtures illustrated herein can be formed from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing by heating the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4,4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon=80/20), and RC-5083 (about 18 to 19 weight percent in NMP/DMAc=15/85), all from Industrial Summit technology Corp., and Parlin, N.J.; DURIMIDE® 100, commercially available from FUJIFILM Electronic Materials U.S.A., Inc.

Polyamic acids of biphenyl tetracarboxylic anhydride/phenylenediamine examples include U-VARNISH® A, and S (about 20 weight percent in NMP), both available from UBE America Inc., New York, N.Y., BPDA resin (about 16.8 weight percent in NMP), available from Kaneka Corporation, and TX, PI-2610 (about 10.5 weight percent in NMP), and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

More specifically, polyamic acid or esters of polyamic acid examples that can be selected for the formation of a polyimide are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorobiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60/40 to about 40/60 and about a 50:50 weight ratio.

Polyimide examples selected for the disclosed intermediate transfer member layer mixtures are represented by at least one of the following formulas/structures, and mixtures thereof

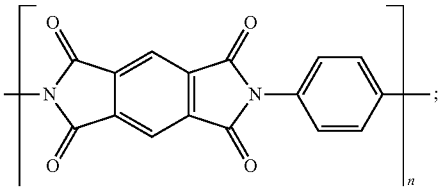

;

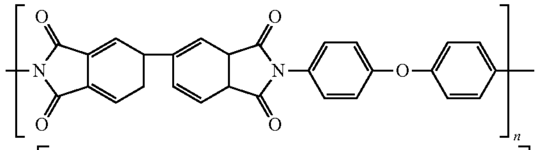

and

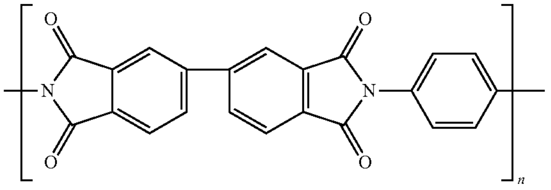

where n represents the number of repeating segments of, for example, from about 5 to about 3,000, from about 50 to about 2,000, from about 50 to about 1,500, from about 200 to about 1,200, from about 1,000 to about 2,000, from about 1,200 to about 1,800, or from about 20 to about 200.

Perfluoropolyether Phosphates

Perfluoropolyether phosphate examples selected for the disclosed intermediate transfer members are polyperfluoroethoxymethoxy difluoroethyl poly(ethylene glycol) phosphate, perfluoropolyether acid phosphate, perfluoropolyether poly(ethylene glycol) phosphate, diphosphoric acid, polymers with ethoxylated reduced ethyl esters of reduced polymerized oxidized tetrafluoroethylene, and mixtures thereof.

The perfluoropolyether phosphates, which can function as a dispersing agent for the conductive components like carbon black when present, and as a leveling agent and release additive for the disclosed mixtures can be represented by the following formulas/structures $$(HO)_2-\underset{\underset{O}{\|}}{P}-O(CH_2CH_2O)_s-CH_2CF_2O-(CF_2CF_2O)_p-(CF_2O)_q-CF_2CH_2-(OCH_2CH_2)_sO-\underset{\underset{O}{\|}}{P}-(OH)_2$$

wherein s represents the number of groups and is, for example, 1 or 2, and where p/q represents the ratio of the respective segments, and which ratio can vary depending, for example, on the amounts of perfluoropolyether phosphates selected, examples of the p/q ratio being from about 0.5 to about 3, from about 0.7 to about 1, from about 0.8 to about 2.5, or from about 0.5 to about 0.8. In embodiments, the value of p can be, for example, from about 6 to about 12, and the value of q can be, for example, from about 3 to about 11.

Specific examples of perfluoropolyether phosphates selected for the disclosed intermediate transfer member mixture can be selected from the group consisting of those represented by the following structures/formulas and mixtures thereof $(HO)_2OP—O—CH_2CH_2O—CH_2CF_2O—(CF_2CF_2O)_6—(CF_2O)_4—CF_2CH_2—OCH_2CH_2—O—PO(OH)_2$;

$(HO)_2OP—O—CH_2CH_2O—CH_2CF_2O—(CF_2CF_2O)_8—(CF_2O)_{10}—CF_2CH_2—OCH_2CH_2—O—PO(OH)_2$;

$(HO)_2OP—O—(CH_2CH_2O)_2—CH_2CF_2O—(CF_2CF_2O)_{10}—(CF_2O)_8—CF_2CH_2—(OCH_2CH_2)_2—O—PO(OH)_2$;

$(HO)_2OP—O—(CH_2CH_2O)_2—CH_2CF_2O—(CF_2CF_2O)_{10}—(CF_2O)_8—CF_2CH_2—(OCH_2CH_2)_2—O—PO(OH)_2$ and $(HO)_2OP—O—(CH_2CH_2O)_2—CH_2CF_2O—(CF_2CF_2O)_{12}—(CF_2O)_6—CF_2CH_2—(OCH_2CH_2)_2—O—PO(OH)_2$.

Yet further specific examples of perfluoropolyether phosphates selected for the disclosed intermediate transfer member mixtures and encompassed by the illustrated herein formulas/structures include FLUOROLINK® F10 (average molecular weight=2,400 to 3,100), and FOMBLIN® HC/P2-1000 (average molecular weight=2,500), both available from Solvay Solexis.

Various amounts of a perfluoropolyether phosphate can be selected for the intermediate transfer member composition, such as for example, from about 0.01 weight percent to about 5 weight percent (of the solids throughout), from about 0.1 to about 1 weight percent, from about 0.1 to about 0.9 weight percent, from about 0.1 to about 1.5 weight percent, from about 0.03 to about 0.4 weight percent, from about 0.03 to about 0.1 weight percent, from about 0.01 to about 0.5 weight percent, from about 0.01 to about 0.05 weight percent, from about 0.01 to about 5 weight percent, or less than or equal to about 0.6 weight percent. In embodiments, the intermediate transfer member composition of the polyimide polymer and the perfluoropolyether phosphate are present in a weight ratio of from about 99.99/0.01 to about 95/5 with the polyimide/conductive component/perfluoropolyether phosphate ratio being from about 50/49.99/0.01 to about 94.9/5/0.1 or about 94.9/0.11/5.

One specific disclosed intermediate transfer member coating comprises a mixture of a polyimide of biphenyl tetracarboxylic dianhydride/phenylenediamine, a conductive component, and the disclosed perfluoropolyether phosphate prepared in a solvent illustrated herein, from about 10 to about 20 percent by weight of solids.

The disclosed polyimide/perfluoropolyether phosphate containing mixture possesses, for example, a Young's modulus of from about 4,000 to about 10,000 MPa, from about 5,000 to about 10,000 MPa, from about 6,500 to about 7,500 MPa, from about 6,000 to about 10,000 MPa, from about 7,800 to about 7,900 MPa, and from about 7,500 to about 8,000 MPa; and an onset decomposition temperature of greater than about 150° C. inclusive of from about 400° C. to about 650° C., from about 500° C. to about 640° C., from about 600° C. to about 630° C., from about 160° C. to about 400° C., and from about 170° C. to about 350° C.

The disclosed glass transition temperatures can be determined by a number of known methods, and more specifically, by Differential Scanning calorimetry (DSC) for the disclosed molecular weights, such as $M_w$ (weight average) and $M_n$ (number average), they can be measured by a number of known methods, and more specifically, by Gel Permeation Chromatography (GPC).

The perfluoropolyether phosphates, which can simultaneously function as a release agent or additive, a leveling agent, and a dispersing agent in contrast to utilizing three different substances, are compatible with the coating solution containing the polyimides and optional components. Additionally, the resulting polyimide/perfluoropolyether phosphate containing mixtures or compositions, after final curing, self-release from a metal substrates like stainless steel and a thick smooth polyimide//conductive component when present/perfluoropolyether phosphate composition intermediate transfer member can be obtained.

Optional Conductive Components or Fillers

The disclosed intermediate transfer member may optionally contain one or more conductive components or fillers to, for example, alter and adjust the conductivity of the intermediate transfer member. Where the intermediate transfer member is a one layer structure, the conductive filler can be included in the mixture containing the perfluoropolyether phosphates disclosed herein. However, where the intermediate transfer member is a multi-layer structure, the conductive filler can be included in one or more layers of the member, such as in the supporting substrate, the polymer layer, or mixtures thereof coated thereon, or in both the supporting substrate and the polymer layer inclusive of the release layer when present. For example, suitable fillers include carbon blacks, metal oxides, polyanilines, graphite, acetylene black, fluorinated carbon blacks, other known suitable fillers, and mixtures of thereof.

Examples of carbon black fillers that can be selected for the intermediate transfer members illustrated herein include special black 4 (B.E.T. surface area=180 $m^2/g$, DBP absorption=1.8 ml/g, primary particle diameter=25 nanometers) available from Evonik-Degussa, special black 5 (B.E.T. surface area=240 $m^2/g$, DBP absorption=1.41 ml/g, primary particle diameter=20 nanometers), color black FW1 (B.E.T. surface area=320 $m^2/g$, DBP absorption=2.89 ml/g, primary particle diameter=13 nanometers), color black FW2 (B.E.T. surface area=460 $m^2/g$, DBP absorption=4.82 ml/g, primary particle diameter=13 nanometers), color black FW200 (B.E.T. surface area=460 $m^2/g$, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), 880 (B.E.T. surface area=240 $m^2/g$, DBP absorption=1.06 ml/g), 800 (B.E.T. surface area=230 $m^2/g$, DBP absorption=0.68 ml/g), L (B.E.T. surface area=138 $m^2/g$, DBP absorption=0.61 ml/g), 570 (B.E.T. surface area=110 $m^2/g$, DBP absorption=1.14 ml/g), 170 (B.E.T. surface area=35 $m^2/g$, DBP absorption=1.22 ml/g), VULCAN® XC72 (B.E.T. surface area=254 $m^2/g$, DBP absorption=1.76 ml/g), XC72R (fluffy form of VULCAN® XC72), XC605, XC305, REGAL® 660 (B.E.T. surface area=112 $m^2/g$, DBP absorption=0.59 ml/g), 400 (B.E.T. surface area=96 $m^2/g$, DBP absorption=0.69 ml/g), 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and 1000 (B.E.T. surface area=343 $m^2/g$, DBP absorption=1.05 ml/g, primary particle diameter=16 nanometers); channel special carbon black 4 and channel special carbon black 5 available from Orion, and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxide fillers include antimony doped tin oxides coated on an inert core particle, such as ZELEC® ECP-S, M and T, available from DuPont Chemicals, Jackson Laboratories, Deepwater, N.J., and those antimony doped non-core containing tin oxides, such as ZELEC® ECP-3005-XC and ZELEC® ECP-3010-XC; available from DuPont Chemicals, Jackson Laboratories, Deepwater, N.J. The core particle may be mica, $TiO_2$ or acicular particles having a hollow or a solid core.

Commercially available from E.I. DuPont or DuPont Chemicals examples of antimony doped tin oxide fillers are ZELEC® ECP 1610-S, 2610-S, 3610-S, 1703-S, 2703-S, 1410-M, 3005-XC, 3010-XC, 1410-T, 3410-T, S-X1, ZELEC® ECP powders that include an acicular hollow shell, an equiaxial titanium dioxide core product (ZELEC® ECP-T), and a plate shaped mica core product (ZELEC® ECP-M).

The antimony doped tin oxide particles can be prepared by densely layering a thin layer of antimony doped tin oxide onto the surface of a silica shell or silica-based particle, wherein the shell, in turn, has been deposited onto a core particle. Also, the antimony doped tin oxide particles are fine enough in size to provide adequate transparency. The silica may either be a hollow shell or layered on the surface of an inert core to form a solid structure.

When present, the filler can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 25 weight percent, from about 5 to about 30 weight percent, from about 15 to about 20 weight percent, or from about 5 to about 20 weight percent based on the total of the solid ingredients in which the filler is included.

Optional Polysiloxane Polymers

The intermediate transfer member disclosed mixtures can also generally comprise a polysiloxane polymer. Examples of polysiloxane polymers selected for the intermediate transfer member mixtures disclosed herein include known suitable polysiloxanes, such as a copolymer of a polyether and a polydimethylsiloxane, commercially available from BYK Chemical as BYK® 333, 330 (about 51 weight percent in methoxypropylacetate), and 344 (about 52.3 weight percent in xylene/isobutanol, ratio of 80/20); BYK®-SILCLEAN 3710 and 3720 (about 25 weight percent in methoxypropanol); a copolymer of a polyester and a polydimethylsiloxane, commercially available from BYK Chemical as BYK® 310 (about 25 weight percent in xylene), and 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and mixtures thereof.

The polysiloxane polymer, or copolymers thereof can be included in the disclosed coating compositions and intermediate transfer members thereof in an amount of, for example, from about 0.1 to about 10 weight percent, from about 0.01 to about 1 weight percent, from about 0.05 to about 1 weight percent, from about 0.05 to about 0.5 weight percent, from about 0.1 to about 0.5 weight percent, from about 0.2 to about 0.5 weight percent, or from about 0.1 to about 0.3 weight percent based on the total weight of the solid components or ingredients present.

Optional Supporting Substrates

If desired, a supporting substrate can be included in the intermediate transfer member, such as beneath the disclosed perfluoropolyether phosphate containing mixture layer. The supporting substrate can be included to provide increased rigidity or strength to the intermediate transfer member.

The disclosed perfluoropolyether phosphate containing coating dispersion can be applied on various suitable supporting substrate materials to form dual layer intermediate transfer members. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11 NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Optional Release Layers

When desired, an optional release layer can be included in the intermediate transfer member, such as in the configuration of a layer over the disclosed perfluoropolyether phosphate mixture containing layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymers (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., polydimethyl siloxane/dibutyl tin diacetate, 0.45 gram DBTDA per 100 grams polydimethyl siloxane rubber mixture, with a molecular weight $M_w$ of approximately 3,500; and fluoroelastomers, such as those available as VITON®, such as copolymers and terpolymers of vinylidenefluoride, hexafluoropropylene, and tetrafluoroethylene, which are known commercially under various designations as VITON® A, E, E60C, E45, E430, B910, GH, B50, and GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene, known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomers can be selected from those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Intermediate Transfer Member Preparation

The disclosed intermediate transfer member coating dispersions can be prepared by a number of known processes. One method for the preparation of the disclosed coating compositions involves mechanical stirring and with no ball milling, and where the perfluoropolyether phosphate release additive/leveling agent/dispersing agent can be initially mixed with a conductive component like carbon black and a solvent with no polyamic acid perturbation. Subsequently, a polyamic acid can then be added to the mixture resulting.

More specifically, the disclosed intermediate transfer coating, such as an intermediate transfer belt (ITB) dispersion mixture, can be prepared in accordance with the following Scheme where a mixture of carbon black, the perfluoropolyether phosphate combination release additive/leveling agent/dispersing agent, available from Solvay Solexis, contained in the disclosed solvents, such NMP can be stirred to form slurry thereof. Subsequently, there can be added to the formed slurry a polyamic acid followed by stirring, and where there results a polyamic acid/carbon black/perfluoropolyether/NMP coating dispersion, which dispersion can then be filtered.

Scheme

CARBON BLACK (CB)/PFPE PHOSPHATE (100/5) IN NMP

MECHANICAL STIRRING
3 HOURS (CB)/PFPE PHOSPHATE/NMP SLURRY

ADD POLYAMIC ACID
MECHANICAL STIRRING
18 HOURS

CB/POLYAMIC ACID/PFPE PHOSPHATE IN NMP COATING DISPERSION

FILTRATION VIA
20 MICRON FILTER

FINAL ITB COATING DISPERSION.

The above prepared final intermediate transfer belt (ITB) liquid coating dispersion mixture can then be flow coated on a metal substrate like a stainless steel substrate, aluminum, nickel, copper, and alloys thereof, and glass plates, and subsequently cured by heating at, for example, from about 50° C. to about 75° C. for from about 25 to about 35 minutes, followed by heating at from about 180° C. to about 195° C. for about from about 25 to about 35 minutes, and then further heating at from about 300° C. to about 325° C. for from about 50 minutes to about 65 minutes. The resulting polyimide intermediate transfer member film with a flat configuration, and with no curl, after drying and cooling to room temperature, about 22° C. to about 25° C., readily released, without the assistance of any external processes, from the metal substrate. That is, the intermediate transfer member films obtained immediate release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed intermediate transfer member film will fully separate, such as for example, a separation of from about 90 to about 100 percent, or from about 95 to about 99 percent from metal substrates, and where release materials and separate release layers can be avoided.

The self-released disclosed intermediate transfer member film coating dispersion mixture can be selected as an intermediate transfer member or the film resulting can be coated on the optional supporting substrates illustrated herein by liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the intermediate transfer member being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to curing can have a thickness of, for example, from about 30 to about 400 microns, from about 15 to about 150 microns, from about 20 to about 100 microns, from about 50 to about 200 microns, from about 70 to about 150 microns, or from about 25 to about 75 microns.

A solvent can be included in the polyimide/perfluoropolyether phosphate containing coating mixture. Examples of the solvents selected are, for example, toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride, and mixtures thereof, where the solvent is selected in, for example, an amount of from about 70 weight percent to about 95 weight percent, or from 80 weight percent to about 90 weight percent based on the amounts of components in the coating mixture.

Specific embodiments will now be described in detail. These examples are intended to be illustrative, and not limited to the materials, conditions, or process parameters set forth in these embodiments. All parts are percentages by solid weight unless otherwise indicated.

COMPARATIVE EXAMPLE 1

There was prepared a coating dispersion of a polyamic acid, which polyamic acid converts after curing by heating into the polyimide of biphenyl tetracarboxylic dianhydride/phenylenediamine of the following formula/structure

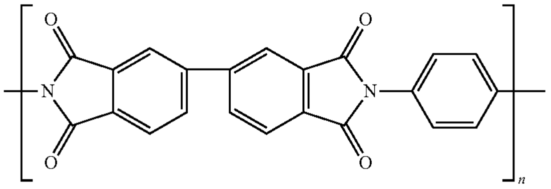

wherein n is about 30.

More specifically, an intermediate transfer coating dispersion was prepared by providing a mixture of Special Carbon Black 4, available from Orion Chemicals, N-ethyl-2-pyrrolidone (NMP) about 18 weight percent of solids, the polyamic acid of biphenyl tetracarboxylicdianhydride/phenylenediamine, and the leveling agent NOVEC™ FC-4432, a fluoro surfactant available from 3M, and which mixture was stirred and subjected to ball milling with 2 millimeter stainless steel shots via an Attritor grinding mill for 18 hours. There resulted a coating dispersion of the polyamic acid of biphenyl tetracarboxylicdianhydride/phenylenediamine/carbon black/leveling agent dispersed in NMP, where the weight ratio of polyamic acid of biphenyl tetracarboxylicdianhydride/phenylenediamine/carbon black/leveling agent was 88.8/11/0.2, and which dispersion was filtered with a 20 micron Nylon cloth filter.

The above prepared liquid coating dispersion was flow coated on a stainless steel substrate, and subsequently cured at 75° C. for 30 minutes, 190° C. for 30 minutes, and 320° C. for 60 minutes. The resulting polyimide containing intermediate transfer member, thickness of 50 microns, did not release from the stainless steel substrate until after soaking in water for about two months.

The carbon black particle size of the dispersion was measured to be about 150 nanometers with a narrow size distribution using a MALVERN HPPS5001 dynamic light scattering instrument.

EXAMPLE I

There was prepared a coating dispersion containing a polyamic acid of biphenyl tetracarboxylicdianhydride/phenylenediamine, which polyamic acid converts, after curing with heating, into the polyimide of biphenyl tetracarboxylic dianhydride/phenylenediamine of the following formula/structure

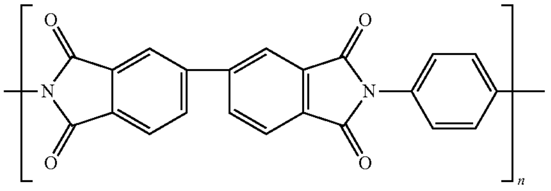

wherein n is about 30.

In the absence of milling, an intermediate transfer coating dispersion was prepared in accordance with the following scheme where a mixture of Special Carbon Black 4, available from Orion Chemicals, the perfluoropolyether phosphate release additive/leveling agent/dispersing agent FLUOROLINK® F10, weight average molecular weight of from about 2,400 to about 3,100, available from Solvay Solexis, weight ratio of 100/5, contained in the solvent NMP, about 18 weight percent solids. The mixture resulting was stirred for three hours to form a slurry thereof.

Subsequently, there was added to the formed slurry the polyamic acid of biphenyl tetracarboxylicdianhydride/phenylenediamine, followed by stirring for 18 hours after which there resulted the polyimide of the above formula/structure of biphenyl tetracarboxylicdianhydride/phenylenediamine/carbon black/perfluoropolyether phosphate phosphate/NMP coating dispersion, which dispersion was filtered with a 20 micron Nylon cloth filter. The polyimide/carbon black/perfluoropolyether phosphate weight ratio was 88.45/11/0.55.

Scheme

CARBON BLACK (CB)/PFPE PHOSPHATE (100/5) IN NMP

MECHANICAL STIRRING
3 HOURS (CB)/PFPE PHOSPHATE/NMP SLURRY

ADD POLYAMIC ACID
MECHANICAL STIRRING
18 HOURS

CB/POLYAMIC ACID/PFPE PHOSPHATE IN NMP COATING DISPERSION

FILTRATION VIA
20 MICRON FILTER

FINAL ITB COATING DISPERSION.

The above prepared final liquid coating dispersion was flow coated on a stainless steel substrate, and subsequently cured at 75° C. for 30 minutes, 190° C. for 30 minutes, and then 320° C. for 60 minutes followed by drying to room temperature, about 25° C. The resulting intermediate transfer member polyimide/carbon black/perfluoropolyether phosphate with the weight ratio of 88.45/11/0.55, thickness of 50 microns, with a flat configuration, and with no curl, self-released without the assistance of any external processes, in about 5 seconds, from the stainless steel substrate. Accomplishing self-release within a range of from about 1 to about 10 seconds is highly desirable.

The carbon black particle size of the dispersion was measured to be about 100 nanometers with a very narrow size distribution using a MALVERN HPPS5001 dynamic light scattering instrument.

The coefficient of thermal expansion (CTE) of the above intermediate transfer members of Comparative Example 1 and Example I was measured using a Thermo-mechanical Analyzer (TMA). The samples were cut using a razor blade and metal die to 4-millimeter wide pieces which were then mounted between the TMA clamps using the 8-millimeter spacing. The samples were pre-loaded to a force of 0.05 N. The CTE values were obtained as a linear fit through the data between −20° C. to 50° C. using the TMA software.

Young's Modulus was measured following the known ASTM D882-97 process. Samples (0.5 inch×12 inch) of each intermediate transfer member were placed in a commercially available InstronTensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results and dividing the tensile stress by the corresponding strain. The tensile stress was calculated by dividing the load by the average cross sectional area of each of the test samples. The tensile stress at which the sample strip broke was recorded as break strength.

The above ITB members of Comparative Example 1 and Example I were measured for surface resistivity (averaging four to six measurements at varying spots, 72° F./65 percent room humidity) using a High Resistivity Meter (Hiresta-Up MCP-HT450 available from Mitsubishi Chemical Corp.).

The following results were obtained

| Example Number | CTE (ppm/° K) | Young's Modulus (MPa) | Break Strength (MPa) | Resistivity (ohm/square) |
|---|---|---|---|---|
| Comparative Example 1 | 30 | 6,000 | 163 | $5.6 \times 10^{10}$ |
| Example I | 24 | 7,860 | 196 | $4.5 \times 10^{10}$ |

The coating dispersion of Example I was prepared with no milling primarily because the disclosed perfluoropolyether phosphate was an excellent dispersing agent for carbon black. In contrast, the Comparative Example 1 coating dispersion was prepared by ball milling, which was a complex and energy-consuming process.

In addition, the resulting intermediate transfer member of Example I showed improved stability and mechanical properties such as about 30 percent higher modulus, about 20 percent higher break strength, and about 20 percent lower CTE over the Comparative Example 1 intermediate transfer member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member, which transfers a developed image in a xerographic system, comprising a layer consisting of a mixture of a polyimide, a perfluoropolyether phosphate, a conductive component selected from the group consisting of carbon blacks, metal oxides, and mixtures thereof, and an optional polysiloxane polymer, wherein said perfluoropolyether phosphate is present in an amount of from about 0.01 to about 5 weight percent of total solids and wherein said polyimide is represented by at least one of the following formulas/structures

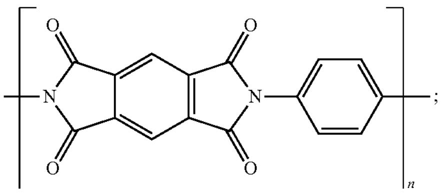
;

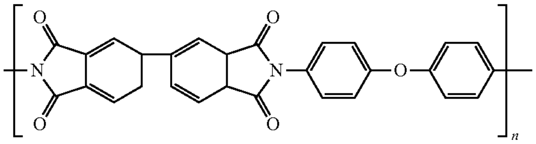
and

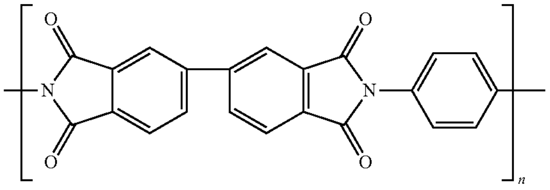

wherein n represents the number of repeating segment of from about 20 to about 200.

2. The intermediate transfer member in accordance with claim 1 wherein said perfluoropolyether phosphate is present in an amount of from about 0.1 to about 1 weight percent of total solids.

3. The intermediate transfer member in accordance with claim 1 wherein said perfluoropolyether phosphate is represented by the following formula/structure $$(HO)_2\text{—}\underset{\underset{O}{\|}}{P}\text{—}O(CH_2CH_2O)_s\text{—}CH_2CF_2O\text{—}(CF_2CF_2O)_p\text{—}(CF_2O)_q\text{—}CF_2CH_2\text{—}(OCH_2CH_2)_sO\text{—}\underset{\underset{O}{\|}}{P}\text{—}(OH)_2$$

wherein the ratio of p/q is from about 0.5 to about 3, and s is 1 or 2.

4. The intermediate transfer member in accordance with claim 3 wherein said perfluoropolyether phosphate is present in an amount of from about 0.1 to about 1 weight percent of total solids.

5. The intermediate transfer member in accordance with claim 1 wherein said optional polysiloxane polymer is present and is selected from the group consisting of a polyester modified polydimethylsiloxane, a polyether modified polydimethylsiloxane, a polyacrylate modified polydimethylsiloxane, and a polyester polyether modified polydimethylsiloxane.

6. The intermediate transfer member in accordance with claim 5 including in contact with said layer, a release layer of at least one component selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof; and wherein said polysiloxane polymer is a copolymer of a polyether and a polydimethylsiloxane, a copolymer of a polyester and a polydimethylsiloxane, a copolymer of a polyacrylate and a polydimethylsiloxane, or a copolymer of a polyester polyether and a polydimethylsiloxane.

7. The intermediate transfer member in accordance with claim 1 wherein the polyimide polymer and the perfluoropolyether phosphate are present in a weight ratio of from about 99.99/0.01 to about 95/5, and wherein said polyimide is represented by the following formula/structure

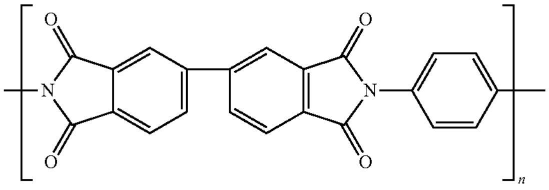

wherein n represents the number of repeating segment of from about 20 to about 200.

8. The intermediate transfer member in accordance with claim 1 with a Young's modulus of from about 4,000 to about 10,000 MPa.

9. The intermediate transfer member in accordance with claim 1 wherein said conductive component is carbon black, and said perfluoropolyether phosphate functions as a dispersing agent for said carbon black.

10. The intermediate transfer member in accordance with claim 1 wherein said perfluoropolyether phosphate is a polyperfluoroethoxymethoxy difluoroethyl poly(ethylene glycol) phosphate, a perfluoropolyether acid phosphate, or a perfluoropolyether poly(ethylene glycol) phosphate.

11. The intermediate transfer member in accordance with claim 1 wherein said perfluoropolyether phosphate is selected from the group consisting of those represented by at least one of the following formulas/structures $(HO)_2OP—O—CH_2CH_2O—CH_2CF_2O—(CF_2CF_2O)_6—(CF_2O)_4—CF_2CH_2—OCH_2CH_2—O—PO(OH)_2$;

$(HO)_2OP—O—CH_2CH_2O—CH_2CF_2O—(CF_2CF_2O)_8—(CF_2O)_{10}—CF_2CH_2—OCH_2CH_2—O—PO(OH)_2$;

$(HO)_2OP—O—(CH_2CH_2O)_2—CH_2CF_2O—(CF_2CF_2O)_{10}—(CF_2O)_8—CF_2CH_2—(OCH_2CH_2)_2—O—PO(OH)_2$;

and $(HO)_2OP—O—(CH_2CH_2O)_2—CH_2CF_2O—(CF_2CF_2O)_{12}—(CF_2O)_6—CF_2CH_2—(OCH_2CH_2)_2—O—PO(OH)_2$.

12. The intermediate transfer member in accordance with claim 1 wherein said intermediate transfer member self-releases from a supporting substrate of a metal subsequent to being deposited on said metal, and which self-release is accomplished in from about 1 to about 10 seconds.

13. The intermediate transfer member in accordance with claim 1 wherein the weight ratio of said polyimide/conductive component/perfluoropolyether phosphate is from about 50/49.99/0.01 to about 94.9/5/0.1.

14. The intermediate transfer member in accordance with claim 1 wherein said perfluoropolyether phosphate simultaneously functions as an internal release additive, a leveling agent, and a dispersing agent.

15. An intermediate transfer member comprising a single layer film consisting of a mixture of a polyimide, carbon black, and a perfluoropolyether phosphate as represented by the following formula/structure $$(HO)_2—\underset{\underset{O}{\|}}{P}—O(CH_2CH_2O)_s—CH_2CF_2O—(CF_2CF_2O)_p—(CF_2O)_q—CF_2CH_2—(OCH_2CH_2)_sO—\underset{\underset{O}{\|}}{P}—(OH)_2$$

where the ratio of p/q is from about 0.5 to about 4, and s is 1 or 2 and wherein said polyimide is represented by at least one of the following formulas/structures

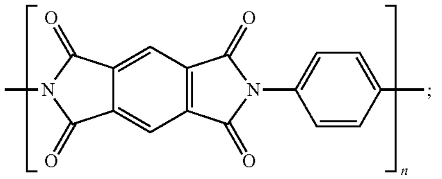

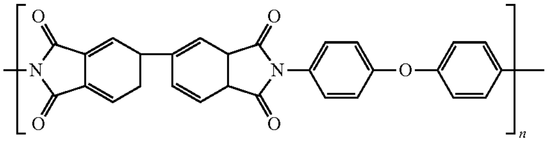

and

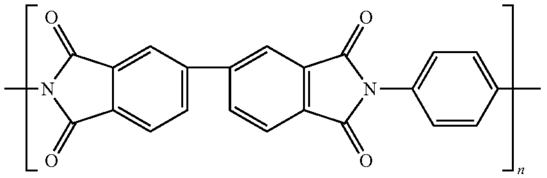

wherein n represents the number of repeating segment of from about 20 to about 200.

16. The intermediate transfer member in accordance with claim 15 wherein p is from about 6 to about 12, and q is from about 3 to about 11.

17. An intermediate transfer member comprising in sequence a supporting substrate, a layer thereover consisting of a mixture of a polyimide, carbon black, and a perfluoropolyether phosphate as represented by the following formulas/structures $(HO)_2OP—O—CH_2CH_2O—CH_2CF_2O—(CF_2CF_2O)_6—(CF_2O)_4—CF_2CH_2—OCH_2CH_2—O—PO(OH)_2$;

$(HO)_2OP—O—CH_2CH_2O—CH_2CF_2O—(CF_2CF_2O)_8—(CF_2O)_{10}—CF_2CH_2—OCH_2CH_2—O—PO(OH)_2$;

$(HO)_2OP—O—(CH_2CH_2O)_2—CH_2CF_2O—(CF_2CF_2O)_{10}—(CF_2O)_8—CF_2CH_2—(OCH_2CH_2)_2—O—PO(OH)_2$ or $(HO)_2OP—O—(CH_2CH_2O)_2—CH_2CF_2O—(CF_2CF_2O)_{12}—(CF_2O)_6—CF_2CH_2—(OCH_2CH_2)_2—O—PO(OH)_2$ and wherein said perfluoropolyether phosphate functions as an internal release additive and a leveling agent for said polyimide, and as a dispersing agent for said carbon black, and wherein said member optionally possesses a Young's modulus of from about 7,500 to about 8,000 MPa.

* * * * *